B. Anyan.
Wheel Cultivator.
No. 89,113. Patented Apr. 20, 1869.

Witnesses:
Chas. Nida
John L. Brook

Inventor:
B. Anyan
per Munn & Co
Attorneys.

Sheet 1—2 Sheets.

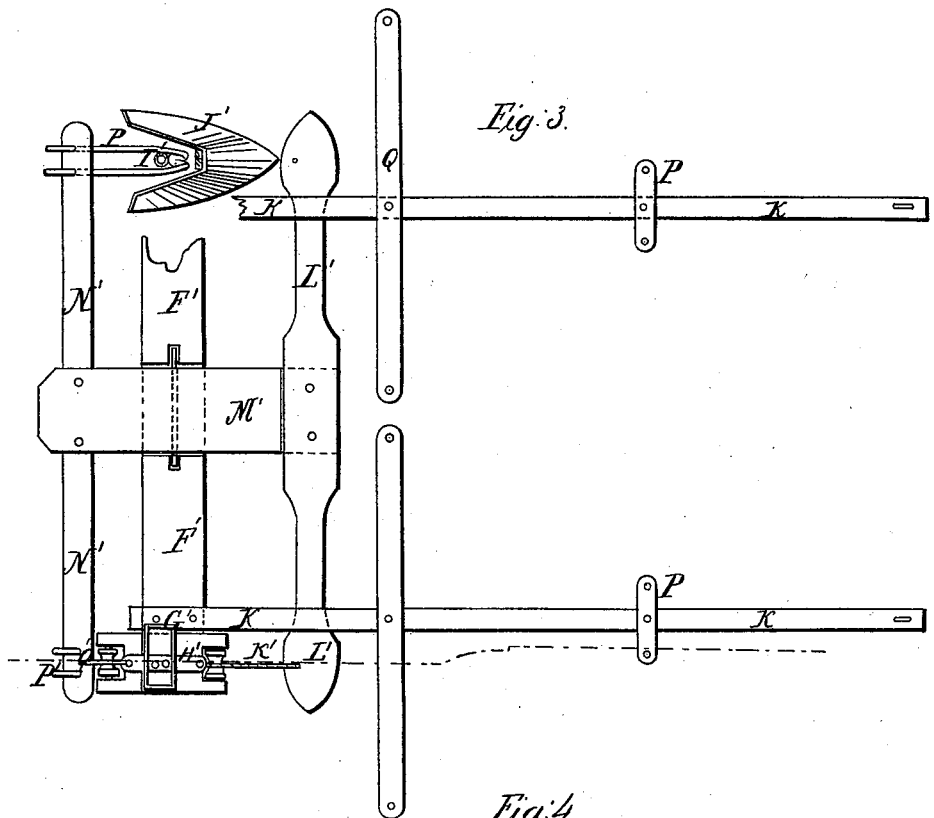

BENJAMIN ANYAN, OF FITCHVILLE, OHIO.

*Letters Patent No. 89,113, dated April 20, 1869.*

IMPROVEMENT IN COMBINED CULTIVATOR AND PLANTER.

The Schedule referred to in these Letters Patent and making part of the same.

*To all whom it may concern:*

Be it known that I, BENJAMIN ANYAN, of Fitchville, in the county of Huron, and State of Ohio, have invented a new and useful Improvement in Combined Cultivator and Planter; and I do hereby declare that the following is a full, clear, and exact description thereof, which will enable others skilled in the art to make and use the same, reference being had to the accompanying drawings, forming part of this specification, in which—

Figure 1:
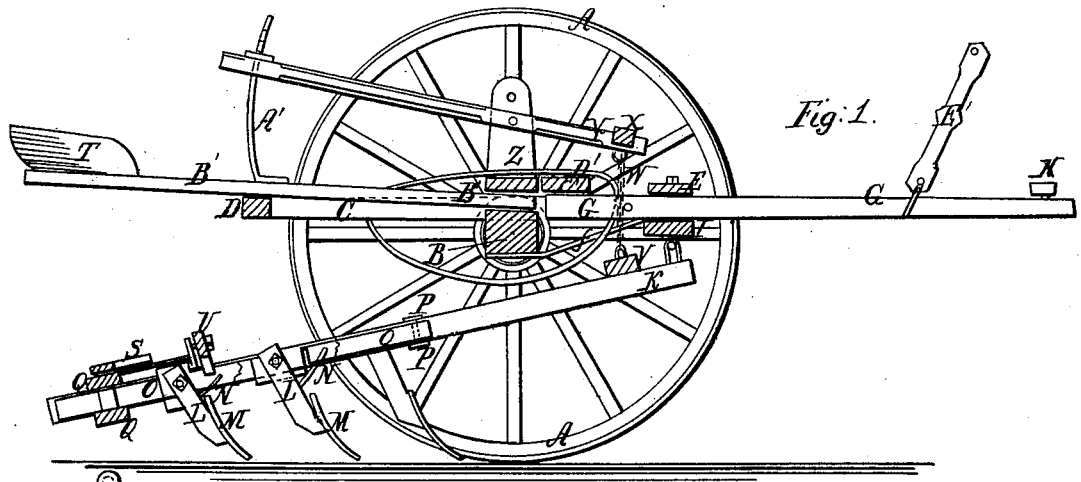

Figure 1, Sheet I, is a detail sectional view of my improved machine when arranged as a cultivator.

Figure 2:
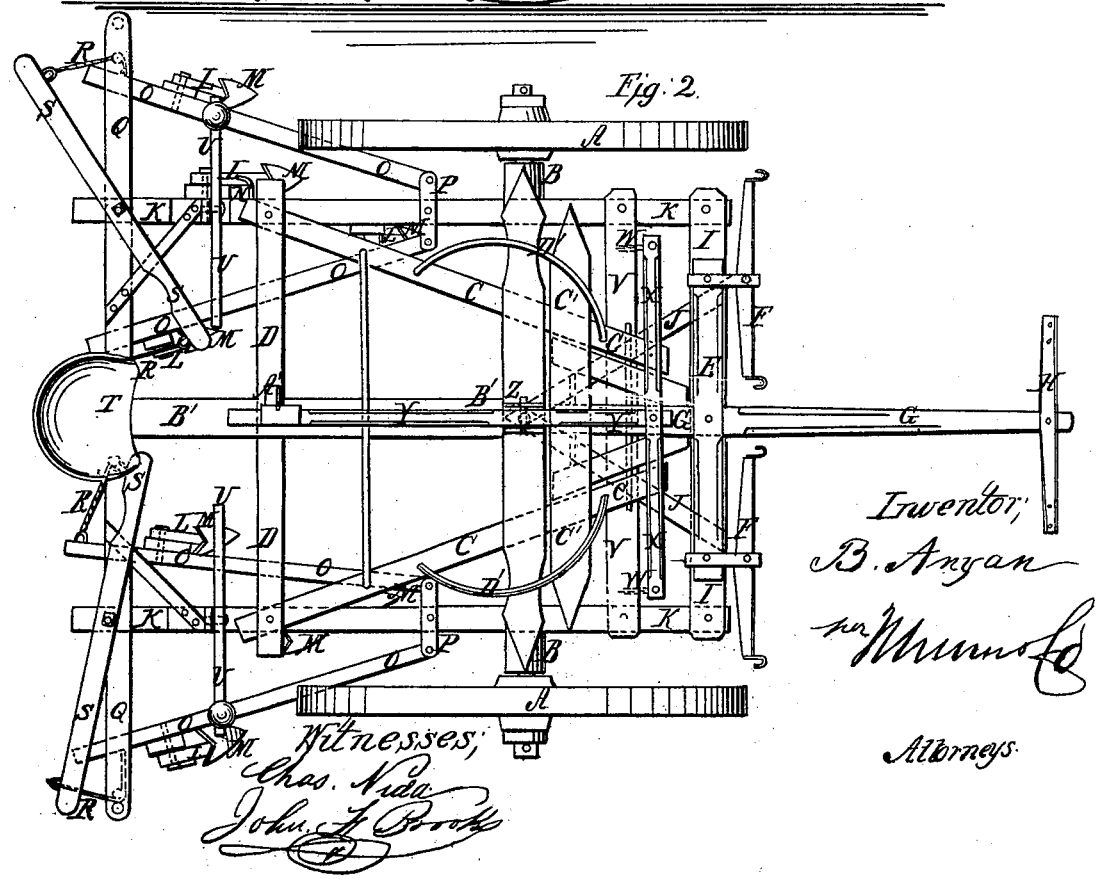

Figure 2, Sheet I, is a top or plan view of the same.

Figure 3, Sheet II, represents the seed-planter as attached to the cultivator-beams, parts being broken away, to show the construction.

Figure 4, Sheet II, is a side view of the same, partly in section, through the line $x\ x$ of fig. 3.

Similar letters of reference indicate corresponding parts.

My invention has for its object to furnish a simple, convenient, and effective machine which shall be so constructed and arranged that it may be easily and quickly adjusted for use as a cultivator or planter, doing its work thoroughly and well in either capacity; and It consists in the construction and combination of various parts of the machine, as hereinafter more fully described.

A represents the wheels;

B, the axle;

C, the hounds;

D, the sway-bar;

E F, the double-tree and whiffle-trees;

G, the tongue; and

H, the neck-yoke, which parts constitute the forward part of the running-gear of a wagon, and about the construction of which there is nothing new.

I is the draught-bar, which is secured at its middle point to the under side of the tongue G, by the hammer-bolt, or other convenient means, and which is kept from vibrating upon said bolt by the brace-bars J, the forward ends of which are secured to the said draught-bar I, and the rear ends of which are connected with the middle part of the under side of the axle B, by the king-bolt, or other convenient means.

To the ends of the draught-bar I are attached the forward ends of the beams K, which extend back beneath the axle B, and to the rear parts of which the cultivator and seed-planter are attached, as occasion may require.

To the opposite sides of the rear parts of the beams K are attached the upper ends of the standards L, two or more of the plows M, the draught strain upon which is sustained by brace-rods N, as shown in fig. 1.

O are the side beams of the cultivators, the forward ends of which are pivoted between the ends of the short bars P, placed one above and one below the beams K, to the middle parts of which the middle parts of the said parts P are securely attached.

To the outer sides of each of the side beams O are attached the upper ends of one or more plow standards L.

The rear ends of the side beams O pass through the spaces between the cross-bars Q, which are placed one above and the other below the beam K, to which their middle parts are securely attached.

R are cords or chains, one end of each of which is attached to the rear end of each of the side beams O.

The cords, or chains R, pass between two rollers, pivoted to and between the ends of the bars Q, and their other ends are attached to the ends of the horizontal foot-levers S, one of the cords R, of each pair, passing back to said lever, and the other forward, as shown in fig. 2.

The foot-levers S are pivoted at their middle points to the rear ends of the beams Q, and upon them, near their inner ends, are formed rests for the driver's feet, so that the driver, from his seat T, can with his feet contract or expand the cultivator frames, to guide the cultivators in cultivating crooked rows, or in avoiding irregular hills or obstructions.

U are lock-levers, which are pivoted at their middle points to supports attached to the beams K, and the ends of which have shoulders formed upon them, which may receive the side beams O, and prevent them from being pushed inward by the resistance of the soil, the other side bar being held out by the foot-levers S.

As the outer side bars are the ones most frequently required to be locked, I prefer to weight the outer ends of the lock-levers U, as shown in fig. 2.

The under side of the middle part of the lock levers U is hollowed out, so that the side beams O, as they are spread apart, may raise the said levers U out of their way.

V is a cross-bar, the ends of which are attached to the forward parts of the beams K, and which crosses the machine beneath the rear end of the tongue G and the forward end of the hounds C.

To the bar V, near its ends, are attached the lower ends of the short chains W, the other ends of which are hooked upon hooks attached to the ends of the cross-bar X, the middle part of which is securely attached to the forward end of the lever Y, which is pivoted to a support, Z, attached to the axle B, or other convenient support.

The rear end of the lever Y extends back into such a position that it may be conveniently reached and operated by the driver from his seat T, to raise the plows from the ground when required.

The lever Y is held in place, holding the cultivators suspended, by catching upon the teeth of the vertical rack-bar A', the lower end of which is securely attached to the seat-board B'.

The seat-board B', to the rear end of which the seat T is attached, rests upon the sway-bar D, and through a hole in its forward end passes the king-bolt, so as to secure the said board in place.

To bring the cultivator more perfectly under the control of the tongue G, it is necessary that the upward and downward play of said tongue should be limited. The downward movement of the forward end of the tongue G is prevented by the bar C', placed above the rear end of the tongue G, and the forward ends of the hounds C, and beneath the guide-bars D', which support the ends of the bolster when turning the wagon.

E' are two brace-bars, the lower ends of which are secured to the forward part of the tongue G, and the upper ends of which are secured to the hames-rings of the harness, so as to bring the said tongue more completely under the control of the horses.

When the machine is to be used as a planter, the side beams O, standards L, and levers S and U are detached from the beams K, and to the rear ends of said beams are attached the ends of the cross-beam, or frame F'.

To the ends of the beam, or frame F', are attached the seed-hoppers G', through the lower part of which pass the dropping-slides H', by which the seed is taken from the hoppers G' in quantities sufficient for a hill, and conveyed to the spout I', by which it is conducted to the ground, in the bottom of the furrow, opened by the plows J', attached to the under side of the ends of the said beam, or frame F', where it is covered by the falling in of the soil in the rear of the said plows J'.

To the forward ends of the dropping-slides H' are attached the rear ends of short cords, or chains K', the other ends of which are attached to the ends of the cross-bar L', which is attached, at its middle part, to the forward end of the lever M', which is pivoted to the middle part of the beam, or frame F', and to the rear end of which is attached the middle part of the cross-bar N', the ends of which are connected with the rear ends of the dropping-slides H' by the short chains, or cords O'.

To the ends of the cross-bar N' are attached the upper ends of the guards P', which are so formed as to cover the lower ends of the conductor spouts I', and detain the seed in the lower ends of said spouts I' until the said guards P' are removed, allowing the seed to drop promptly to the ground.

The rear cross-bar N' is made heavy, so as to overbalance the forward cross-bar L', and by its superior weight draw the slides H' back into the hoppers G', for a fresh quantity of seed, and at the same time remove the guards P' from under the lower end of the spouts I'.

The forward cross-bar L' is lowered to drop the seed, and at the same time cover the lower ends of the spouts I', by the driver by bearing down with his feet upon the said forward cross-bar L'; and as the downward pressure is removed the weight of the rear cross-bar N' draws the slide H' back into the hoppers G', and at the same time uncovers the lower ends of the spout I', allowing the seed to drop to the ground.

Having thus described my invention,

I claim as new, and desire to secure by Letters Patent—

1. The combination of the stationary cross-bar Q, foot-levers S, and cords, or chains R, with the central beam K and movable side beams O of the cultivator, substantially as herein shown and described, and for the purpose set forth.

2. The combination of the pivoted lock-lever U with the central beam K and movable side beams O of a cultivator, substantially as herein shown and described, and for the purpose set forth.

3. The combination of the cross-bar L', lever M', cross-bar N', and guards P', with the spouts I', plows J', slide H', hopper G', beam, or frame F', and beams K, substantially as herein shown and described, and for the purpose set forth.

4. The combination of the cross-bar V, chains W, cross-bar X, lever Y, rack-bar A', and seat-board B, with the beams K and forward part of the running-gear of a wagon, substantially as herein shown and described, and for the purpose set forth.

5. The combination of the brace-bars E' with the forward part of the tongue G, substantially as and for the purpose herein set forth and described.

BENJAMIN ANYAN.

Witnesses:
C. S. VANCENAR,
CHARLES J. HIGGINS.